May 24, 1949.  E. P. NEWMAN  2,471,343
CONTROL SYSTEM
Filed Jan. 6, 1945
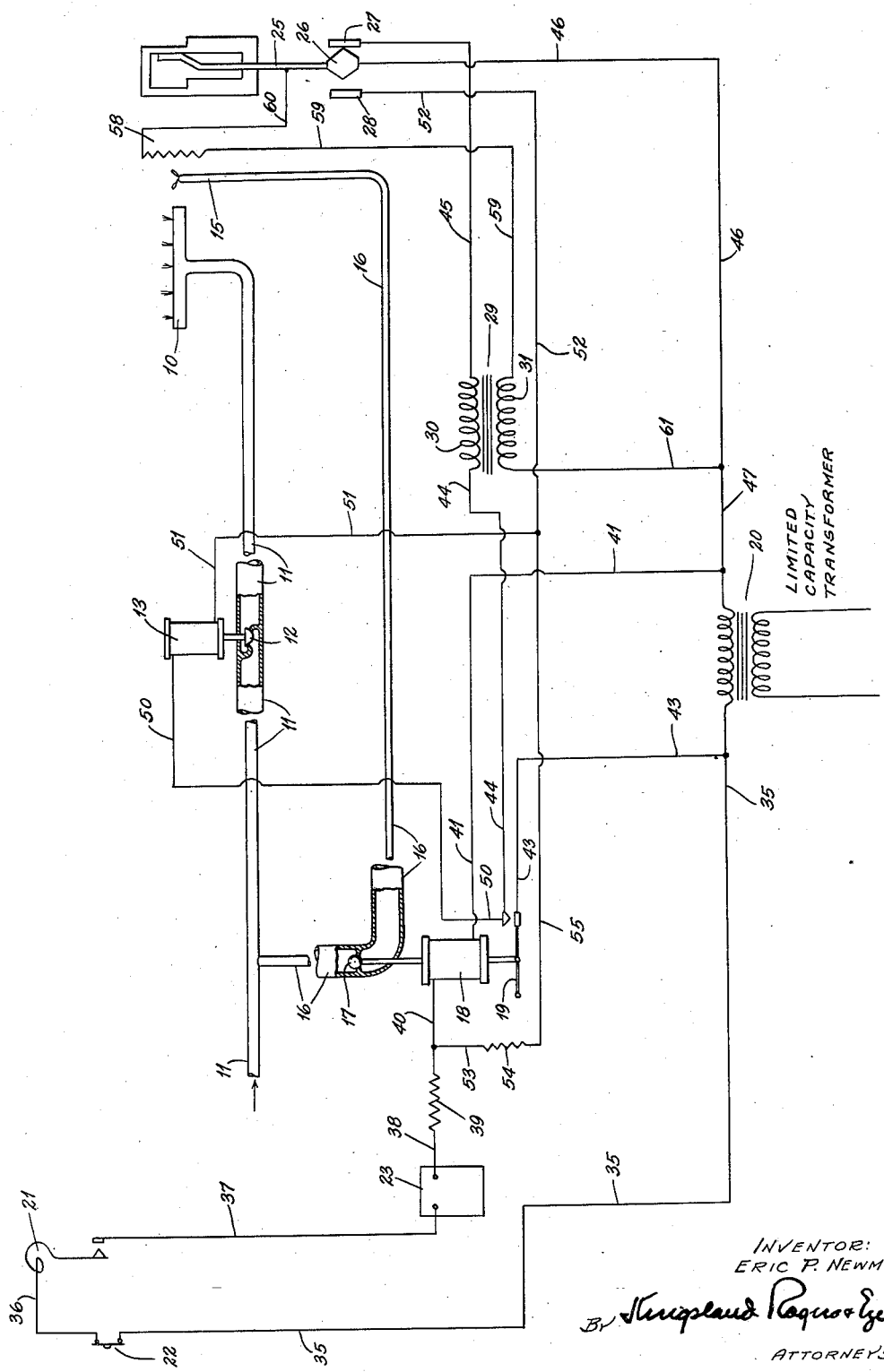
INVENTOR:
ERIC P. NEWMAN,
By Kingsland Rogers & Ezell
ATTORNEYS.

Patented May 24, 1949

2,471,343

UNITED STATES PATENT OFFICE 2,471,343

CONTROL SYSTEM

Eric P. Newman, Clayton, Mo., assignor, by mesne assignments, to Missouri Automatic Control Corporation, a corporation of Missouri Application January 6, 1945, Serial No. 571,624

12 Claims. (Cl. 158—117.1)

The present invention relates to a control system especially adapted to the control of fuel burners. More particularly, it relates to a control for main and pilot burners for heating a space, under regulation of a space thermostat.

It is an object of the invention to provide a control wherein the room thermostat circuit opens only a pilot valve line and where the main valve line is open only upon existence of combustion of the pilot flame. More particularly, it is an object to provide such a control having an igniter device operated in response to closure of the room thermostat for ignition of the pilot burner, with a circuit to the igniter that is an unbroken or a solid circuit, free of switches.

A further object is to provide a control wherein the igniter circuit operates from a low voltage transformer, the igniter being in series with a secondary thereof, without a break in its circuit and with the primary thereof under control of the room thermostat indirectly and a pilot valve relay directly.

A further object is to provide a control of this kind wherein a main transformer or power source alternately carries the load of a main gas valve and an igniter, the result being produced by connections to the hot and cold sides, respectively, of a flame responsive switch.

A further object is to provide a control of this kind which will be held in a safe position upon momentary power failure until the flame safety switch has cycled through a cold position.

A particular object is to provide a control that, upon release of a pilot valve relay, will prevent reoperation of the relay while the safety switch is in hot position.

The drawing shows a wiring diagram of the system.

A main burner 10 is supplied by a fuel line 11, in which a main fuel valve 12 is interposed. This valve is operated by a solenoid 13.

Additionally, there is a pilot burner 15 fed from a pilot line 16 in which a pilot valve 17 is interposed. The line 15 is connected into the fuel supply line 11 ahead of the main gas valve 12. The pilot valve 17 is operated by a solenoid 18 which also operates a pilot switch 19.

The electrical parts include a first transformer 20, which may be a relatively high voltage transformer. There is a room thermostat 21 disposed in the space of which the temperature is to be controlled. A summer-winter switch 22 for manual operation is provided in the room thermostat circuit. There is a limit switch 23 of conventional construction to limit the maximum temperature of the burner system.

A flame safety switch 25 is disposed adjacent the pilot burner to respond to the existence of pilot flame or the absence thereof. Preferably, the flame switch 25 is of the rate-of-change type described in co-pending application, Serial No. 540,372, filed June 15, 1944, now Patent 2,407,438, granted September 10, 1946, by this inventor. The flame switch 25 is of the S. P. D. T. type with a movable contact 26 adapted to close with either a fixed contact 27 or a fixed contact 28.

The control system also includes a low voltage transformer 29 having a primary 30 and a secondary 31.

The connections include the following:

The room thermostat circuit is connected from the secondary of the main transformer 20 by a line 35 through the summer-winter switch 22, and by a line 36 into the room thermostat 21. From the room thermostat switch, a line 37 leads to the limit switch 23, and from it a line 38 leads to a resistor 39. From this resistor, a line 40 leads to the coil 18, and from the coil 18 a line 41 leads back to the secondary of the transformer 20.

The coil 18 controls the pilot switch 19 as well as the pilot valve 17. The movable contact of this pilot switch is connected by a line 43 to the secondary of the transformer 20. The other contact of the switch 19 is connected by a line 44 into the primary 30 of the low voltage transformer 29. From this primary, a line 45 leads to the cold contact 27 of the pilot flame safety switch 25. The movable contact 26 of the switch 25 is connected to a line 46, which is connected with a line 47, in turn connected into the secondary of the main transformer 20.

Returning to the pilot switch 19, its fixed contact is also connected by a line 50 into the main gas valve coil 13, from which a line 51 is connected to a line 52 that leads to the hot fixed contact 28 of the flame safety switch 25. The line 52 also is connected with lines providing a partial shunt for the pilot valve relay coil 18. To this end, a line 53 is interposed into the line 40 between the resistance 39 and the coil 18.

The line 53 leads to a resistance 54, from which a line 55 leads to the line 52.

An igniter device 58 is disposed adjacent the pilot burner 15. The secondary 31 of the low voltage transformer is connected by a line 59 to the igniter 58, from which a line 60 connects to the movable contact 26 of the flame safety switch. The other side of the secondary 31 is connected by a line 61 to the line 46.

*Operation*

When the room thermostat is satisfied, the system is in the condition shown in the drawing. When the room thermostat demands heat, it closes its switch, thereby establishing a circuit from the transformer 20 by the line 35, the switch 22, the line 36, the thermostat 21, the line 37, the limit switch 23, the line 38, the resistor 39, the line 40, the pilot valve coil 18, and the line 41 back to the transformer.

When the coil 18 is thus energized, it opens the pilot valve 17, admitting fuel to the pilot burner 15, and it closes the pilot switch 19. Closure of the pilot switch 19 establishes a circuit through the primary 30 of the low voltage transformer 29 when the pilot flame switch 25 is in cold position, the circuit being as follows: the transformer 20, the line 43, the switch 19, the line 44, the primary 30, the line 45, the cold contact 27 of the flame switch 25, the contact 26 thereof, and the lines 46 and 47 back to the secondary of the main transformer. This closure of the circuit to the primary 30 of the low voltage transformer immediately energizes the secondary 31 thereof which is in a solid circuit for the igniter 58. This circuit is established from the secondary 31 through the line 59 to the igniter 58, and thence by the line 60, the contact 26, the line 46, and the line 61 back to the secondary 31. The igniter is thereby energized to ignite the pilot flame.

When the pilot flame ignites, it impinges upon the flame safety switch 25, and causes the contact 26 to break with the contact 27 and to make with the hot contact 28. This operation breaks the circuit to the primary of the low voltage transformer 30, cutting out the igniter from energization, but it also closes the circuit to energize the coil 13 and open the main gas valve 12. This circuit runs from the secondary of the main transformer 20 by the line 43 to the pilot switch 19, as already established. From the pilot switch 19, it runs by the line 50 to the main gas valve coil 13, whence it passes by the line 51 to the line 52, to the hot contact 28 of the flame switch 25. It is closed through the movable contact 26 of this switch by the lines 46 and 47 back to the transformer 20. When the main gas valve is thus opened, the main burner is ignited from the pilot flame.

This closure of the flame switch 25 with the contact 28 also establishes a partial shunt for the pilot valve coil 18, which shunt runs from the line 49 through the line 53, the resistance 54, the line 55, the line 52, the contacts 28 and 26 of the flame switch 25, and the lines 46 and 47 back to the transformer 20, thus reducing the current through the parallel parts consisting of the line 40, the pilot valve coil 18, and the line 41. The effect of this shunt is to limit the force of the solenoid 18 to that required to hold the pilot valve 17 open and the switch 19 closed but below that required to pull the core up to establish these conditions. The resistors 39 and 54 accomplish the foregoing.

By the foregoing, the running period is established and will continue as long as the room thermostat remains closed. When it becomes satisfied and opens, the relay coil 18 is deenergized with the result that the pilot valve closes and the switch 19 is opened. This immediately breaks the circuit to the main gas valve, which closes. Both the main and the pilot flames are thereby extinguished. The flame safety switch 25 moves to cold position and reestablishes the conditions for the restart of the igniter upon a new cycle.

In the event of flame failure of the pilot flame during a running period, the flame switch will move from the contact 28 to the contact 27. As soon as it leaves the contact 28, it breaks the main gas valve circuit so that this valve closes. As soon as it closes with the contact 27, it reestablishes the ignition circuit. As long as the room thermostat demands heat, the ignition circuit will be completed through the pilot relay coil 19, and the pilot valve 17 will open. When flame is reestablished at the pilot burner, the flame safety will return to its running position, reopening the main valve.

Since the main gas valve is not opened until the pilot flame switch 25 is hot, any momentary pilot flame sufficient to close the contacts 26 and 28 will establish at least a brief running period. If the pilot switch fails to heat for any reason, such as complete failure of ignition of the pilot burner, the main valve will never be opened.

In the case of momentary power failure during a running period or momentary opening of the thermostatic switch, both relays will drop out, closing both pilot and main valves and opening the switch 19. Assuming demand at the room thermostat upon restoration of power, the pilot valve coil 18 will again receive current. If, however, the flame safety switch 25 has not had a chance to cool but still is closed with the contact 28, the shunt circuit around the coil 18 through the contacts 26 and 28 will decrease the power of the coil 18 so that the same cannot be pulled in until the pilot safety 25 breaks the contacts 26 and 28. Hence the pilot valve 17 will remain closed and the switch 19 will remain open as long as the flame safety is in hot position. When the shunt circuit is finally broken, the coil 18 can pull its core up. However, the main valve will then be held closed until the flame switch 25 reheats.

It may be seen that failure of the flame switch 25 in either position results in a safe condition. If it fails in the cold position, the main gas valve cannot be opened. If it fails in hot position, then, as soon as the room thermostat opens, the circuit to the coil 18 will be broken, releasing the coil. A reclosure of the room thermostat cannot pull the core of the coil 18 up because of the then closed shunt circuit through the resistor 54.

If the room thermostat circuit remains closed for such a period that the furnace is excessively heated, the limit switch 23 will open. The result will be the same as if the room thermostat had opened. When the limit switch recloses, assuming the room thermostat remains closed, a new cycle will be established from the beginning, and the furnace will cycle on the limit switch until the room thermostat is opened.

It will be seen that the low voltage transformer alternates with the main gas valve coil as a load on the main transformer 20. Hence the operation of the igniter does not change the power on the main gas valve.

The solid igniter circuit is free of contact effect on its overall resistance, which contact effect, caused by dirty contacts or the like, can sharply increase the resistance of such a low voltage circuit to the point where the operation of the igniter itself might be undependable.

Further, the transformer 20 is preferably of the high-reactance, or limited capacity, type, capable of supplying voltage enough to operate the coil 13 or the igniter transformer and its system separately but not together. If, for some reason such as the double engagement of the contact 26 of the safety switch 25 with both contacts 27 and 28 at once, simultaneously closing both the igniter and main coil circuits, insufficient voltage will be delivered by the secondary of the main transformer to operate the coil 13 to open the main valve or to energize the second transformer sufficiently to cause the igniter to glow. Such condition might arise at the end of any cycle, when the contacts 26 and 28 stuck and the safety 25 cooled to close additionally with the contact 27, or when dirt or foreign substances short-circuited the switch, or the like. This safety feature prevents a recycle that would open the main valve as soon as the thermostat opens.

What is claimed is:

1. In a fuel control for use with main and pilot burners, a main valve, a pilot valve, an external control, a pilot flame combustion switch closed in response to combustion at the pilot burner, means responsive to operation of the external control for opening the pilot valve, a pilot switch means closed by opening of the pilot valve, means including the pilot switch means and the combustion switch in closed position responsive to existence of pilot flame for opening the main valve, and electrical means energized upon closure of the combustion switch to prevent initial closure of the pilot switch means when the combustion switch is in closed position.

2. In a control for use with main and pilot burners, a pilot valve, a main valve, an electromagnetic switch, a combustion safety switch operated in response to existence of pilot flame, means to effect opening of the pilot valve and closure of the electromagnetic switch, means including the said electromagnetic switch and the safety switch, when operated, to effect opening of the main valve, and a shunting circuit around the electromagnetic switch and closed through the safety switch, when operated, to reduce the power of the electromagnetic switch to below that required to operate the same to closed position but not below that required to hold the same operated.

3. In a control for use with main and pilot burners, a pilot valve, a main valve, an electromagnetic relay including a relay coil and a relay switch closed upon energization of the coil, a combustion safety switch operated from a cold to a hot position in response to existence of pilot flame, an ignition means, means to effect energization of the coil and opening of the pilot valve, means including said switch and the safety switch in cold position, to operate the ignition means, means including the said relay switch and the safety switch, in hot position, to effect opening of the main valve, and a shunting circuit around the electromagnetic switch and closed through the safety switch, when operated, to reduce the power of the electromagnetic switch to below that required to operate the same to closed position but not below that required to hold the same operated.

4. In a burner control for use with a main burner, a main fuel supply valve, a pilot burner, a main transformer, and an external thermostat, an electrically operated igniter, a safety switch operated from a cold position to a hot position, said operation being dependent upon the operation of the pilot burner, means operated in response to heat demand at the thermostat to effect a circuit for energizing the igniter from the secondary of the transformer, said circuit including the safety switch in cold position, and a circuit for operating the main fuel valve from the secondary of the transformer including the safety switch in hot position, said transformer being of the limited capacity type, with inherent impedance such that it is incapable of producing voltage to operate the igniter and the main valve simultaneously.

5. In a control for use with main and pilot burners, and an extraneous primary control device, the combination of a pilot burner combustion-responsive switch, operated to circuit closing position upon existence of a pilot flame, a relay including a relay power element and relay switch, fuel supply means for the main burner, circuit means through the relay power element adapted to be energized by the primary control device, to effect closure of the relay switch, electrical means including the relay switch, the fuel supply means, and the combustion-responsive switch, to effect operation of the fuel supply means when said two switches are closed, and electrical means including a circuit closed when the combustion-responsive switch is in closed position, and means in said last-named circuit to prevent the relay power element from pulling in the relay switch, without preventing the power element from holding it in.

6. In a control for use with main and pilot burners, and an extraneous primary control device, the combination of a pilot burner combustion-responsive switch, operated to circuit closing position upon existence of a pilot flame, a pilot burner fuel supply control, a relay including a relay power element and relay switch, fuel supply means for the main burner, circuit means through the relay power element adapted to be energized by the primary control device, to effect closure of the relay switch, electrical means to operate the pilot burner fuel supply control to supply pilot fuel when the relay is energized, electrical means including the relay switch, the fuel supply means, and the combustion-responsive switch, to effect operation of the fuel supply means when said two switches are closed, and electrical means including a circuit closed when the combustion-responsive switch is in closed position, and means in said last-named circuit to prevent the relay power element from pulling in the relay switch, without preventing the power element from holding it in.

7. In a control for use with main and pilot burners, and an extraneous primary control device, the combination of a pilot burner combustion-responsive switch, operated to circuit closing position upon existence of a pilot flame, a relay including a relay power element and relay switch, fuel supply means for the main burner, circuit means through the relay power element adapted to be energized by the primary control device, to effect closure of the relay switch, electrical means including the relay switch, the fuel supply means, and the combustion-responsive switch, to effect operation of the fuel supply means when said two switches are closed, and electrical means including a circuit closed when the combustion-responsive switch is in closed position, and means in said last-named circuit to prevent the relay power element from pulling in the relay switch, without preventing the power element from holding it in, said electrical means comprising a partial shunt of the relay power element.

8. In a control for use with main and pilot burners, and an extraneous primary control device, the combination of a pilot burner combustion-responsive switch, operated to circuit closing position upon existence of a pilot flame, a pilot burner fuel supply control, a relay including a relay power element and relay switch, fuel supply means for the main burner, circuit means through the relay power element adapted to be energized by the primary control device, to effect closure of the relay switch, electrical means to operate the pilot burner fuel supply control to supply pilot fuel when the relay is energized, electrical means including the relay switch, the fuel supply means, and the combustion-responsive switch, to effect operation of the fuel supply means when said two switches are closed, and electrical means including a circuit closed when the combustion-responsive switch is in closed position, and means in said last-named circuit to prevent the relay power element from pulling in the relay switch, without preventing the power element from holding it in, an igniter for the pilot flame, the combustion switch having contacts closed when it is cold, and means energized upon closure of said contacts and the relay switch, to effect operation of the igniter.

9. In a control for use with main and pilot burners, and an extraneous primary control device, the combination of a pilot burner combustion-responsive switch, operated to circuit closing position upon existence of a pilot flame, a pilot burner fuel supply control, a relay including a relay power element and relay switch, fuel supply means for the main burner, circuit means through the relay power element adapted to be energized by the primary control device, to effect closure of the relay switch, electrical means to operate the pilot burner fuel supply control to supply pilot fuel when the relay is energized, electrical means including the relay switch, the fuel supply means, and the combustion-responsive switch, to effect operation of the fuel supply means when said two switches are closed, and electrical means including a circuit closed when the combustion-responsive switch is in closed position, and means in said last-named circuit to prevent the relay power element from pulling in the relay switch, without preventing the power element from holding it in, an igniter for the pilot flame, the combustion switch having contacts closed when it is cold, and means energized upon closure of said contacts and the relay switch, to effect operation of the igniter, said means including a transformer primary in series with the said cold contacts and the relay switch, a secondary, and an ignition device in series with the secondary.

10. In a control for use with main and pilot burners, and a space thermostat, the combination of a main burner fuel supply control means, a relay coil and a relay switch operated thereby, a combustion-responsive switch disposed to be operated by a pilot flame, power supply lines in the control adapted to be energized from a power source, the first side of the relay coil being connected with one power line, and the other side adapted to be connected in series with the thermostat to the other power line, the combustion-responsive switch being connected at its first side with one power line, and at its second side with one side of the main burner fuel supply control means, the other side of which is connected in series with the relay switch, to the other power line, and a partial shunt connection between the second side of the relay coil and the second side of the combustion switch, to reduce the relay coil power to between that required to pull the relay switch in and that required to hold the switch in.

11. In a fuel control for use with main and pilot burners and a space thermostat, a relay having a power element and a switch operated upon energization of the power element, said power element being adapted to be connected for energization upon demand by the space thermostat, a pilot valve adapted to be opened when the relay is energized, to admit fuel to the pilot burner, a pilot burner combustion switch closed upon existence of a pilot flame, and means responsive to closure of said combustion switch to reduce the power of the relay power element to between that required to hold the relay switch closed and that required to pull the same closed.

12. In a control for fuel burners having an electrically operable fuel supply means, electrically operable burner starting means, a limited capacity electric power supply means, means including first circuit connections with the power means to energize the burner starting means, and second circuit connections with the power means to energize the fuel supply means, selecting switch mechanism in said first and second circuit connections operable separately to select one or the other of said circuit connections for connection with the power means, said power means being of the limited capacity type, with inherent impedance such that it is incapable of supplying enough power to start operation of the fuel supply means when both said circuit connections are simultaneously connected to it for energization at the same time.

ERIC P. NEWMAN.

REFERENCES CITED

The following references are of record in the file of this patent:

UNITED STATES PATENTS

| Number | Name | Date |
|---|---|---|
| 2,077,297 | Williams | Apr. 13, 1937 |
| 2,085,195 | Kerr | June 29, 1937 |
| 2,119,503 | Kriechbaum | May 31, 1938 |
| 2,200,908 | Beggs | May 14, 1940 |
| 2,261,092 | Peterson | Oct. 28, 1941 |
| 2,269,157 | Levine | Jan. 6, 1942 |
| 2,291,805 | Denison | Aug. 4, 1942 |
| 2,371,020 | Beam | Mar. 6, 1945 |